US011519742B2

(12) United States Patent
Voznesensky et al.

(10) Patent No.: US 11,519,742 B2
(45) Date of Patent: Dec. 6, 2022

(54) ROUTING AUTONOMOUS VEHICLES USING TEMPORAL DATA

(71) Applicant: Uber Technologies, Inc., San Francisco, CA (US)

(72) Inventors: Michael Voznesensky, San Francisco, CA (US); Brent Goldman, San Francisco, CA (US); Mark Yen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 19 days.

(21) Appl. No.: 16/721,673

(22) Filed: Dec. 19, 2019

(65) Prior Publication Data

US 2020/0200553 A1 Jun. 25, 2020

Related U.S. Application Data

(60) Provisional application No. 62/782,296, filed on Dec. 19, 2018.

(51) Int. Cl.
*G01C 21/34* (2006.01)
*B60W 40/06* (2012.01)
(Continued)

(52) U.S. Cl.
CPC ......... *G01C 21/3461* (2013.01); *B60W 40/06* (2013.01); *G01C 21/3492* (2013.01);
(Continued)

(58) Field of Classification Search
CPC ............. G01C 21/3697; G05D 1/0278; G06Q 10/047; G08G 1/0967
See application file for complete search history.

(56) References Cited

U.S. PATENT DOCUMENTS 10,083,604 B2 *  9/2018  Ricci .................... G08G 1/0133
11,091,211 B1 *  8/2021  Ebrahimi Afrouzi .. B62D 24/00
(Continued)

FOREIGN PATENT DOCUMENTS

EP      1484581      12/2004
EP      1512943       3/2005
(Continued)

OTHER PUBLICATIONS

"International Application Serial No. PCT US2019 067631, Invitation to Pay Additional Fees mailed Apr. 29, 2020", 5 pgs.
(Continued)

*Primary Examiner* — Jeff A Burke
*Assistant Examiner* — Jerrod Irvin Davis
(74) *Attorney, Agent, or Firm* — Schwegman Lundberg & Woessner, P.A.

(57) ABSTRACT

Various examples are directed to systems and methods for routing an autonomous vehicle. For example, a system may access temporal data comprising a first temporal data item. The first temporal data item may describe a first roadway condition, a first time, and a first location. The system may also access a routing graph that comprises a plurality of route components and determine that a first route component of the routing graph corresponds to the first location. The system may generate a constrained routing graph at least in part by modifying the first route component based at least in part on the first roadway condition. The system may additionally generate a route for an autonomous vehicle using the constrained routing graph; and cause the autonomous vehicle to begin traversing the route.

20 Claims, 13 Drawing Sheets

(51) Int. Cl.
    *G01C 21/36*    (2006.01)
    *G05D 1/02*    (2020.01)
    *G06Q 10/04*    (2012.01)
    *G08G 1/0967*    (2006.01)

(52) U.S. Cl.
    CPC ....... *G01C 21/3697* (2013.01); *G05D 1/0278* (2013.01); *G06Q 10/047* (2013.01); *G08G 1/096725* (2013.01)

(56) References Cited

U.S. PATENT DOCUMENTS

| | | | |
|---|---|---|---|
| 2008/0004789 | A1 | 1/2008 | Horvitz et al. |
| 2017/0316333 | A1* | 11/2017 | Levinson ............. G05D 1/0248 |
| 2017/0323249 | A1* | 11/2017 | Khasis ............... G01C 21/3469 |
| 2019/0120640 | A1* | 4/2019 | Ho ..................... G01C 21/3453 |
| 2019/0235517 | A1* | 8/2019 | Beauvillain ........... B60W 40/04 |
| 2019/0304097 | A1* | 10/2019 | Eade ...................... G01C 21/20 |
| 2019/0383626 | A1* | 12/2019 | Fowe ................... G08G 1/0112 |
| 2020/0124435 | A1* | 4/2020 | Edwards ............. G08G 1/0965 |

FOREIGN PATENT DOCUMENTS

| | | |
|---|---|---|
| FR | 2931231 | 11/2009 |
| WO | 2020132339 | 6/2020 |

OTHER PUBLICATIONS

"International Application Serial No. PCT US2019 067631, International Search Report dated Jun. 23, 2020", 7 pgs.

"International Application Serial No. PCT US2019 067631, Written Opinion dated Jun. 23, 2020", 11 pgs.

Yan, Liping, "SALA: A Self-Adaptive Learning Algorithm—Towards Efficient Dynamic Route Guidance in Urban Traffic Networks", Neural Processing Letters, Kluwer Academic Publishers, Norwell, MA, US, vol. 50, No. 1, (Jun. 2, 2018), 77-101.

"International Application Serial No. PCT/US2019/067631, International Preliminary Report on Patentability dated Jul. 1, 2021", 13 pgs.

* cited by examiner

ROUTING AUTONOMOUS VEHICLES USING TEMPORAL DATA

CLAIM FOR PRIORITY

This application claims the benefit of priority of U.S. Application Ser. No. 62/782,296, filed Dec. 19, 2018, which is hereby incorporated by reference in its entirety.

FIELD

This document pertains generally, but not by way of limitation, to devices, systems, and methods for operating and/or managing an autonomous vehicle.

BACKGROUND

An autonomous vehicle is a vehicle capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
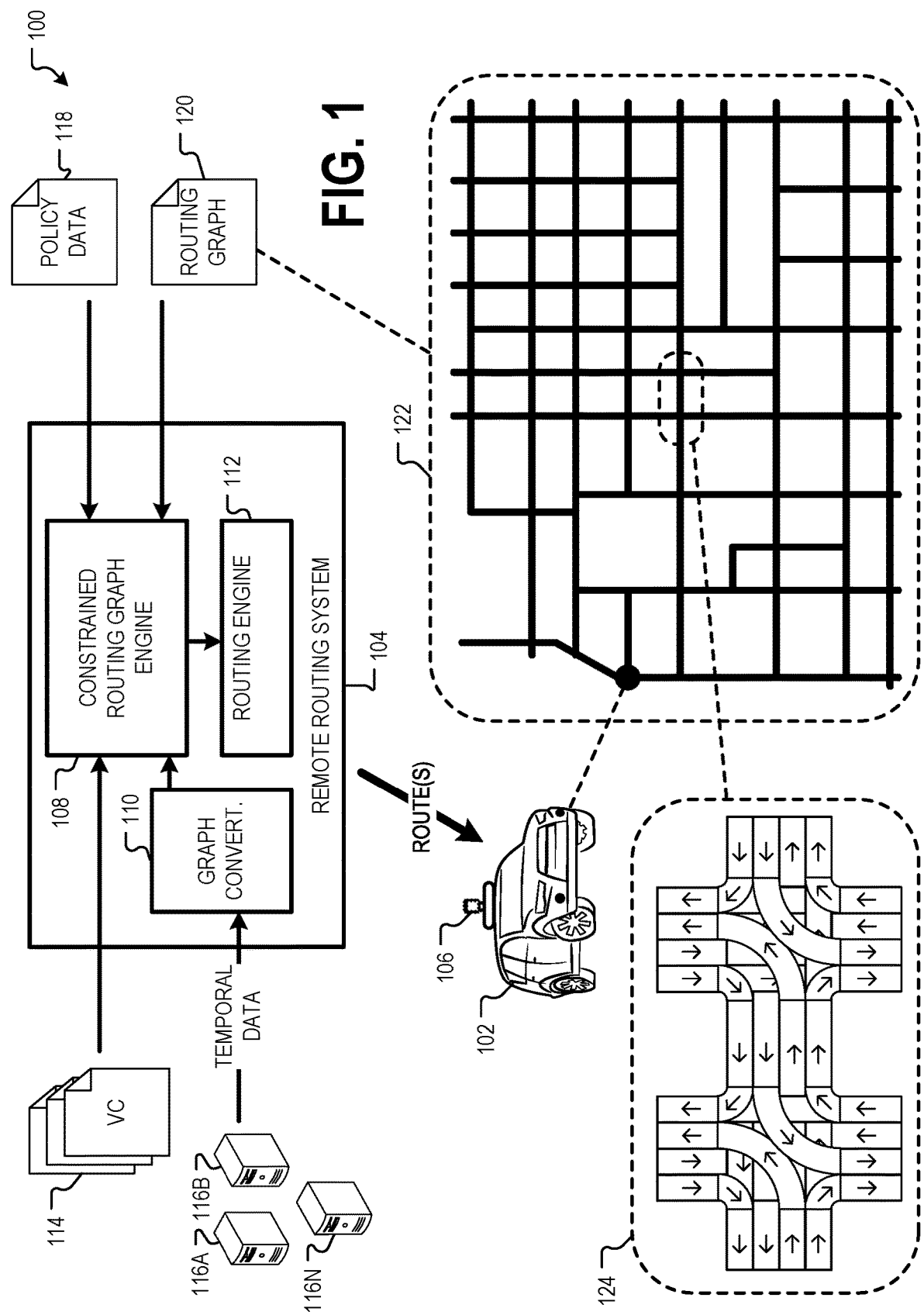
FIG. 1 is a diagram showing one example of an environment for routing autonomous vehicles using temporal data.

Examples described herein are directed to systems and methods for routing autonomous vehicles using temporal data. Temporal data is data that describes a time-dependent condition of a roadway. For example, temporal data can describe traffic conditions on the roadway, weather conditions on the roadway, construction conditions on the roadway, or other related time-dependent conditions.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

Autonomous vehicles are programmed to execute trips. An autonomous vehicle executes a trip by traversing from a trip start point to a trip end point. For some trips, the vehicle picks up a passenger or cargo at the vehicle start point and drops off the passenger or cargo at the trip end point. Also, some trips include waypoints. Waypoints are positions where the autonomous vehicle passes and/or stops between the trip start point and the trip end point. In some examples, waypoints are implemented to execute a transportation service for more than one passenger or more than one cargo. For example, passengers and/or cargo may be picked up and/or dropped off at some or all of the waypoints. A vehicle stops at one or more waypoints to pick up or drop off passengers and/or cargo or can pass through a waypoint without stopping. Examples of cargo can include, food, material goods, and the like.

A routing engine can generate routes for autonomous vehicle trips. A route is a path that an autonomous vehicle takes, or plans to take, over one or more roadways to execute a trip. A routing engine can be on-board the autonomous vehicle or remote from the autonomous vehicle. In some examples, the functionality of the routing engine is split between an on-board component and a remote component.

The routing engine can generate a route using a routing graph. A routing graph is a representation of roadways in a geographic area. The routing graph represents roadways as a set of route components, which are sometimes also referred to as lane segments. The routing graph indicates the connectivity of the components along with various costs. For example, the routing graph can indicate costs to traverse a particular route component and/or costs to transition from one route component to another.

The routing engine applies a path planning algorithm to the routing graph to generate a route. The route includes a set of route components extending from the trip start point to the trip end point. In some examples, the selected route includes the set of route components between the trip start and end points that has the lowest total cost. Any suitable path planning algorithm can be used such as, for example, A*, D*, Focused D*, D* Lite, GD*, or Dijkstra's algorithm. A route generated by the routing engine is provided to an autonomous vehicle. The vehicle autonomy system of the vehicle controls the vehicle along the route.

When routing an autonomous vehicle, it is desirable to consider temporal data to increase the predictability of vehicle routing and to avoid routing the vehicle into unfavorable traffic, weather, or other temporary conditions. For example, the lowest-cost route between a first point and a second point may ordinarily include traversing roadways that are part of an interstate. If an autonomous vehicle is to complete a route at a time when traffic conditions lower the speed of travel on the interstate, routes including the interstate may no longer be fastest.

Incorporating temporal data into autonomous vehicle routing, however, can present technical challenges that may not be present in other contexts. For example, common sources of temporal data may not map directly to route components of an autonomous vehicle routing graph. Consider Global Positioning System (GPS) trace data that tracks vehicles by location (e.g., latitude and longitude). A traffic, weather, or other temporal condition of a roadway can be indicated by the vehicle speed, which, in some examples, is derived from multiple positions for the same vehicle. Translating GPS traces to a routing graph, however, can be nontrivial. For example, as described further herein, different lanes of a roadway can have different conditions, but a GPS trace may not be accurate enough to specify the lane or lanes to which it refers. Also, some sources of temporal data are referenced to an alternative routing graph or other map having components that do not map to the route components of the routing graph used to route an autonomous vehicle. For example, some temporal data is collected from vehicles (e.g., non-autonomous vehicles) that are routed with a simplified map that does not distinguish between lanes of travel.

Another example difficulty for incorporating temporal data into autonomous vehicle routing is related to costing. Routing autonomous vehicles using a routing graph, as described herein, can include assigning a cost to different route components and/or transitions between route components. One example way that a routing engine can account for temporal data is to modify one or more costs in the routing graph. For example, the cost of traversing route components experiencing high traffic density can be increased.

These and other challenges may be addressed by the systems and methods described herein for routing autonomous vehicles. Various examples described herein utilize temporal data that indicates times, locations, and roadway conditions. Temporal data can include data items describing a roadway condition and a location. In some examples, temporal data items also describe a time when the roadway condition was encountered. One example temporal data item includes a GPS trace from a vehicle traversing a roadway. The GPS trace can describe the location of the vehicle, a speed of the vehicle (indicating the roadway condition) and, optionally, a time when the GPS trace was collected. Another example temporal data item can include a map segment, an indication of a roadway condition at the map segment and, optionally, an associated time.

Temporal data items are correlated to route components of an autonomous vehicle routing graph and used to generate a constrained routing graph, which is then used to generate routes. The constrained routing graph includes changes to a routing graph based on the temporal data. Such changes can include, for example, changes to the cost of traversing one or more route components or moving between one or more sets of route components. Such changes can also include changes to the connectivity of the routing graph. For example, if the temporal data indicates that a route component is impassable, the constrained routing graph may eliminate connections to that route component. Constrained routing graphs can be repeatedly re-generated to account for changes in temporal data.

In some examples, the changes to generate a constrained routing graph are expressed as route constraints. A route constraint indicates a route component or route component property and an associated modification to the routing graph. In some examples, the generation of route constraints based on temporal data can be separated from the generating of the constrained routing graph. For example, a remote routing system can receive temporal data and generate routing constraints. The routing constraints can be provided to an on-board routing engine for generating the constrained routing graph and routing based thereon.

FIG. 1 is a diagram showing one example of an environment 100 for routing autonomous vehicles using temporal data. The environment 100 includes a remote routing system 104 and an example autonomous vehicle 102. The vehicle 102 can be a passenger vehicle, such as a truck, a car, a bus or other similar vehicle. The vehicle 102 can also be a delivery vehicle, such as a van, a truck, a tractor trailer, and so forth. The vehicle 102 is a self-driving vehicle (SDV) or autonomous vehicle (AV). For example, the vehicle 102 includes a vehicle autonomy system, described in more detail herein, that is configured to operate some or all the controls of the vehicle 102 (e.g., acceleration, braking, steering).

In some examples, the vehicle 102 is operable in different modes where the vehicle autonomy system has differing levels of control over the vehicle 102 in different modes. For example, the vehicle 102 may be operable in a full autonomous mode in which the vehicle autonomy system has responsibility for all or most of the controls of the vehicle 102. In some examples, the vehicle 102 is operable in a semiautonomous mode that is in addition to or instead of the full autonomous mode. In a semiautonomous mode, the vehicle autonomy system of the vehicle 102 is responsible for some of the vehicle controls while a human user or driver is responsible for other vehicle controls. In some examples, the vehicle 102 is operable in a manual mode in which the human user is responsible for all control of the vehicle 102.

The vehicle 102 includes one or more remote detection sensors 106. Remote detection sensors 106 receive return signals from the environment 100. Return signals may be reflected from objects in the environment 100, such as the ground, buildings, trees, and so forth. The remote-detection sensors 106 may include one or more active sensors, such as light imaging detection and ranging (LIDAR), radio detection and ranging (RADAR), and/or sound navigation and ranging (SONAR) that emit sound or electromagnetic radiation in the form of light or radio waves to generate return signals. Information about the environment 100 is extracted from the return signals. In some examples, the remote-detection sensors 106 include one or more passive sensors that receive return signals that originated from other sources of sound or electromagnetic radiation. Remote-detection sensors 106 provide remote sensor data that describes the environment 100. The vehicles 102 can also include other types of sensors, for example, as described in more detail herein.

The example of FIG. 1 includes a remote routing system 104 to generate routes for the autonomous vehicle 102 using temporal data. The remote routing system 104 generates routes using a routing graph 120, temporal data from temporal data sources 116A, 116B, 116N, and other constraint data such as, for example, vehicle capability data 114 and policy data 118.

As described herein, the routing graph 120 represents the roadways in a geographic area as a set of route components. The routing graph 120 indicates directionality, connectivity, and cost for the various route components making up the roadways. Directionality indicates the direction of travel in a route component. Connectivity describes possible transitions between route components. Cost describes the cost for an autonomous vehicle 102 to traverse a route component and/or to transition between two route components.

In FIG. 1, break-out window 122 shows example roadways that can be described by the routing graph 120. Another break-out window 124 shows example route components making up part of the routing graph 120. Route components in the break-out window 124 are illustrated as shapes with arrows indicating the directionality of the route components. Route components can be connected to one another according to their directionality.

The temporal data sources 116A, 116B, 116N can include any suitable computing hardware such as, for example, one or more servers. The temporal data sources 116A, 116B, 116N can be or include any source that can provide temporal data in whole or in part. One example temporal data source 116A, 116B, 116N can track GPS traces received from vehicles traversing roadways (e.g., autonomous and/or non-autonomous vehicles). Another example temporal data source 116A, 116B, 116N can receive reports of roadway conditions from drivers or other observers. Another example temporal data source 116A, 116B, 116N can include a weather reporting and/or forecasting service.

Temporal data is received by a graph converter 110 of the remote routing system 104. The graph converter 110 correlates temporal data items to specific route components of a routing graph 120 used by the remote routing system. In some examples, the graph converter 110 also generates routing constraints based on the temporal data items. The routing constraints describe modifications to the routing graph 120 in response to the temporal data. For example, if temporal data indicates that particular route components are experiencing heavy traffic, the graph converter 110 can generate a routing constraint identifying the route components and a modification to the routing graph 120 for those route components (e.g., an increase in the cost of traversing or transitioning to the route components). In some examples, a routing constraint generated from temporal data can include a change to a route component property. For example, if temporal data indicates that it is raining in a particular area, a route constraint generated by the graph converter 110 can update the properties of route components in the area to indicate rain.

Routing constraints generated by the graph converter 110 are provided to a constrained routing graph engine 108 that generates a constrained routing graph. The routing graph 120 may be a general purpose routing graph that is usable to generate routes in different temporal conditions and, in some examples, for different types of autonomous vehicles. For example, the constrained routing graph engine 108 may generate the constrained routing graph by applying one or more routing constraints to the routing graph 120.

In some examples, the constrained routing graph engine 108 can consider routing constraints generated from temporal data as well as other routing constraints. For example, the constrained routing graph engine 108 can also receive vehicle capability data 114, such as operational domain data (OD or ODD). Vehicle capability data 114 can include route constraints based on the capabilities of the vehicle 102. In some examples, the remote routing system 104 routes multiple autonomous vehicles of different types. Different types of autonomous vehicles can have different hardware and/or different software components such as different vehicle autonomy systems, different remote or other sensors, and so forth. Accordingly, different types of autonomous vehicles can have different sets of corresponding vehicle capability data 114.

The constrained routing graph engine 108 can also receive policy data 118. Policy data 118 can describe routing constraints that are based on human-generated policies. For example, it may be undesirable to route autonomous vehicles through school zones. Accordingly, policy data 118 can include a routing constraint that increases the cost of and/or removes connectivity to route components that include all or part of a school zone.

In some examples, other routing constraints, such as those derived from vehicle capability data 114 or policy data 118, are dependent on temporal data. For example, autonomous vehicles of one type may not be capable of operating in the rain. In this example, routing constraint derived temporal data may modify properties of route components where it is currently raining. A routing constraint derived from vehicle capability data 114 may increase the cost or eliminate connectivity to those route components for some or all autonomous vehicles routed by the remote routing system. A routing engine 112 receives the constrained routing graph generated by the constrained rouging graph engine 108 and generates routes that are provided to the vehicle 102.

Although one vehicle 102 is shown in FIG. 1, the remote routing system 104 may be configured to provide routes to a plurality of vehicles, as described herein. In some examples, the remote routing system 104 can also be and/or operate in conjunction with a dispatch system to dispatch trips to autonomous vehicles. For example, the remote routing system 104 can generate candidate routes for a set of candidate vehicles for executing a trip. The dispatch system can select a best vehicle for the trip, for example, based on the vehicle having the lowest-cost route. The dispatch system can then cause the selected autonomous vehicle to begin traversing its route by requesting that the selected vehicle execute the trip. In some examples, the selected vehicle can decline a trip, in which case the dispatch system may offer the trip to an alternate candidate vehicle.

Figure 2:
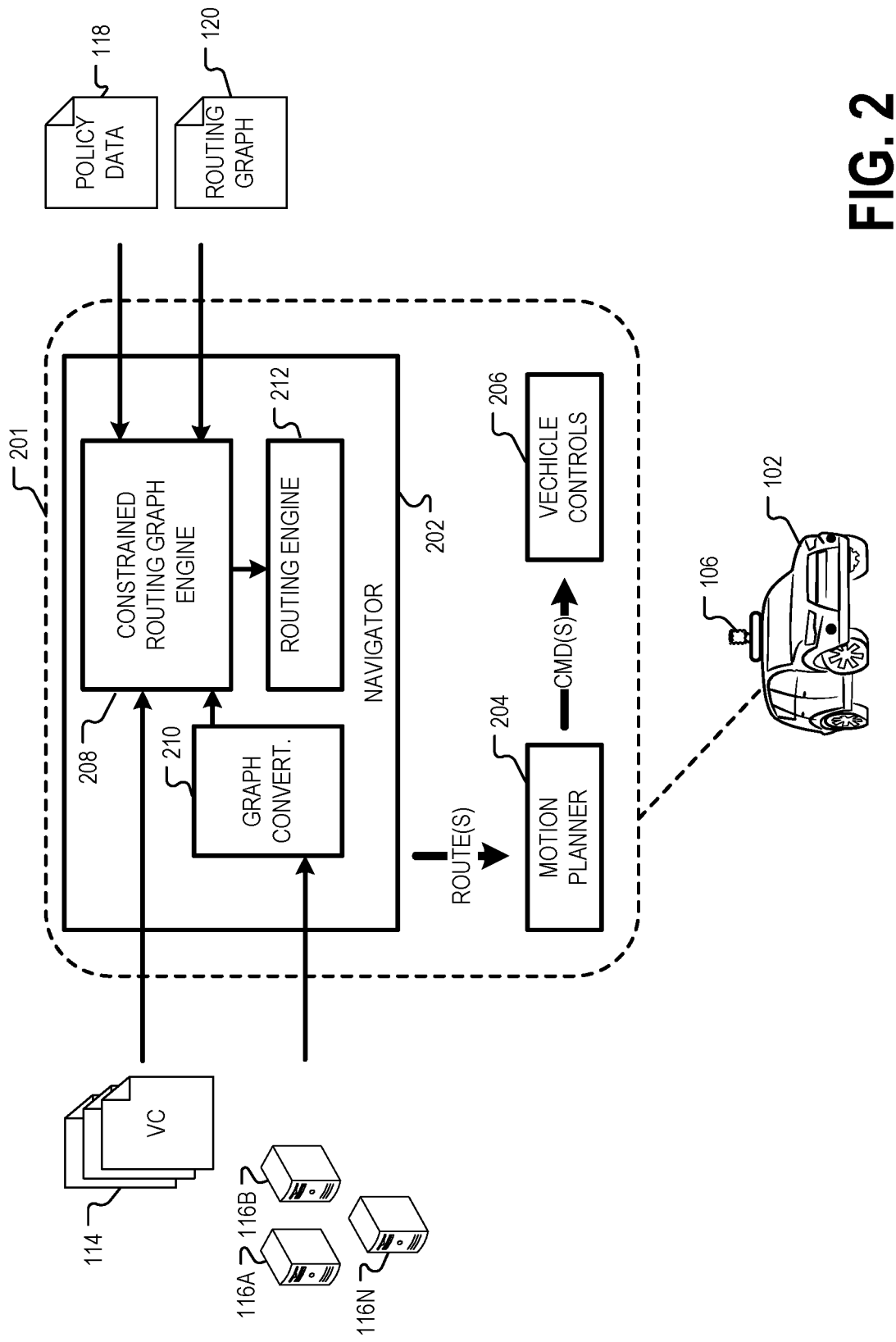
FIG. 2 is a diagram showing one example of routing using temporal data implemented onboard the vehicle.

In the example of FIG. 1, routing using temporal data is implemented by the remote routing system 104. In some examples, however, routing using temporal data can be executed locally onboard the vehicle 102. FIG. 2 is a diagram showing one example of routing using temporal data implemented onboard the vehicle 102. The vehicle includes a vehicle autonomy system 201. The vehicle autonomy system 201 includes a navigator system 202, a motion planner 204, and vehicle controls 206. The navigator system 202 implements a graph converter 210, constrained routing graph engine 208, and routing engine 212 similar to the graph converter 110, constrained routing graph engine 108, and routing engine 112 described in FIG. 1. Routes generated by the navigator system 202 are provided to a motion planner 204. The motion planner 204 converts the routes into commands that are provided to vehicle controls 206. Additional details of example navigator systems, motion planner systems, and vehicle controls are provided herein with reference to FIG. 4.

Figure 3:
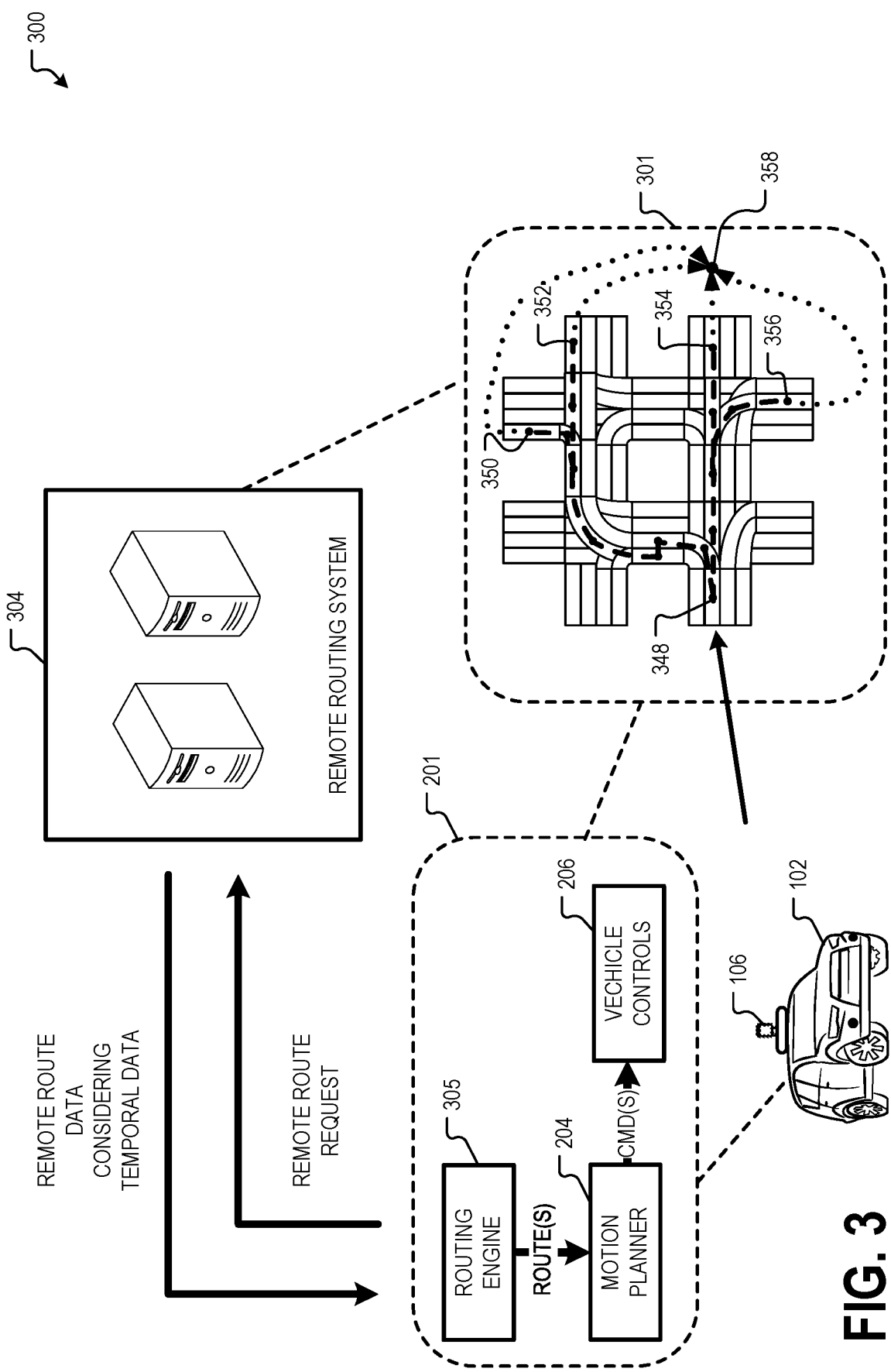
FIG. 3 is a diagram showing one example of an environment in which routing using temporal data is divided between a remote routing system and an on-board routing engine.

FIG. 3 is a diagram showing one example of an environment 300 in which routing using temporal data is divided between a remote routing system 304 and an on-board routing engine 305. In this example, the vehicle autonomy system 201 includes an on-board routing engine 305 that is configured to communicate with a remote routing system 304 to execute routing using temporal data.

Routing can be divided between the remote routing system 304 and the on-board routing engine 305 in any suitable manner. In some examples, the remote routing system 304 receives temporal data and/or other constraint data as shown in FIG. 1 and generates routing constraints. The routing constraints are provided to the on-board routing engine 305. The vehicle autonomy system 201 generates routes using the on-board routing engine 305 and a routing graph that may be stored on the vehicle 102. In another example, the remote routing system generates a constrained routing graph, for example, as described with respect to FIG. 1. The remote routing system 304 provides the constrained routing graph to the routing engine 305, which uses it to generate routes.

In yet another example, the on-board routing engine 305 performs local routing and the remote routing system 304 performs remote routing. An example of this concept is illustrated in window 301. The on-board routing engine 305 uses a routing graph stored on-board the vehicle 102 to generate local routes from the vehicle's location 348 to one or more exit points 350, 352, 354, 356. The on-board routing engine 305 then sends a remote route request to the remote routing system. The remote route request indicates the exit points 350, 352, 354, 356. The remote routing system 304 generates remote routes from the respective exit points 350, 352, 354, 356 to a trip end point 358. The remote routing system provides the remote routes (and/or costs associated with the remote routes) to the on-board routing engine 305. The on-board routing engine 305 considers the remote routes and/or corresponding costs and selects a local route. For example, the on-board routing engine 305 can select the combination of local and remote routes having the lowest overall cost.

In some examples, temporal data can be considered differently at the on-board routing engine 305 than it is at the remote routing system 304. In some examples, the remote routing system 304 generates remote routes using a constrained routing graph generated with up-to-date temporal data. The on-board routing engine 305 can generate local routes without considering temporal data and/or while considering less up-to-date temporal data. For example, the vehicle autonomy system 201 may receive limited temporal data updates.

Figure 4:
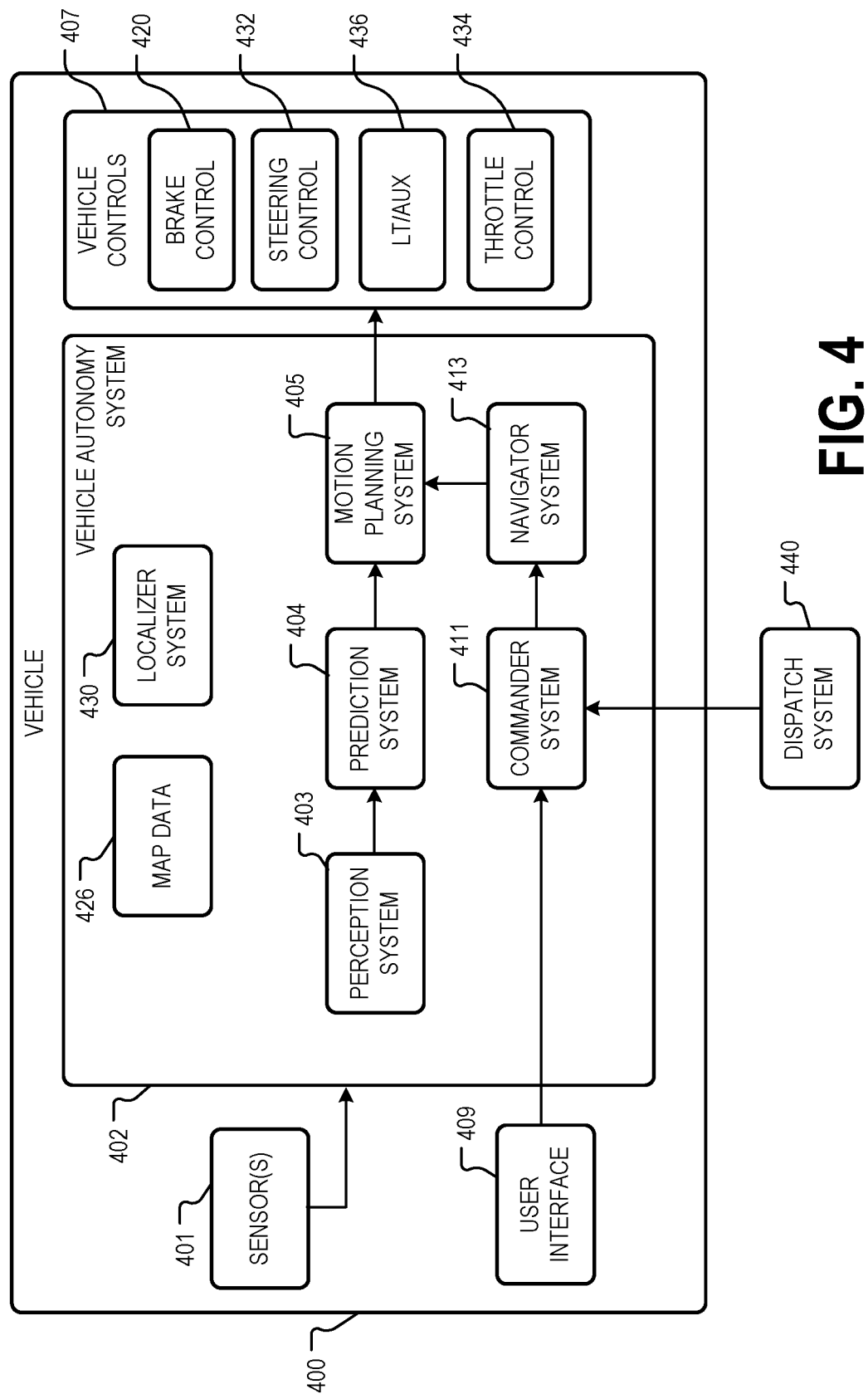
FIG. 4 depicts a block diagram of an example vehicle according to example aspects of the present disclosure.

FIG. 4 depicts a block diagram of an example vehicle 400, according to example aspects of the present disclosure. The vehicle 400 includes one or more sensors 401, a vehicle autonomy system 402, and one or more vehicle controls 407. The vehicle 400 is an autonomous vehicle, as described herein. The example vehicle 400 shows just one example arrangement of an autonomous vehicle. In some examples, autonomous vehicles of different types can have different arrangements.

The vehicle autonomy system 402 includes a commander system 411, a navigator system 413, a perception system 403, a prediction system 404, a motion planning system 405, and a localizer system 430 that cooperate to perceive the surrounding environment of the vehicle 400 and determine a motion plan for controlling the motion of the vehicle 400 accordingly.

The vehicle autonomy system 402 is engaged to control the vehicle 400 or to assist in controlling the vehicle 400. In particular, the vehicle autonomy system 402 receives sensor data from the one or more sensors 401, attempts to comprehend the environment surrounding the vehicle 400 by performing various processing techniques on data collected by the sensors 401, and generates an appropriate route through the environment. The vehicle autonomy system 402 sends commands to control the one or more vehicle controls 407 to operate the vehicle 400 according to the route.

Various portions of the vehicle autonomy system 402 receive sensor data from the one or more sensors 401. For example, the sensors 401 may include remote-detection sensors as well as motion sensors such as an inertial measurement unit (IMU), one or more encoders, or one or more odometers. The sensor data includes information that describes the location of objects within the surrounding environment of the vehicle 400, information that describes the motion of the vehicle 400, and so forth.

The sensors 401 may also include one or more remote-detection sensors or sensor systems, such as a LIDAR, a RADAR, one or more cameras, and so forth. As one example, a LIDAR system of the one or more sensors 401 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 401 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 401 may generate sensor data (e.g., remote sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 401 can include a positioning system. The positioning system determines a current position of the vehicle 400. The positioning system can be any device or circuitry for analyzing the position of the vehicle 400. For example, the positioning system can determine a position by using one or more of inertial sensors, a satellite positioning system such as a GPS, based on Internet Protocol (IP) address, by using triangulation and/or proximity to network access points or other network components (e.g., cellular towers, WiFi access points), and/or other suitable techniques. The position of the vehicle 400 can be used by various systems of the vehicle autonomy system 402.

Thus, the one or more sensors 401 are used to collect sensor data that includes information that describes the location (e.g., in three-dimensional space relative to the vehicle 400) of points that correspond to objects within the surrounding environment of the vehicle 400. In some implementations, the sensors 401 can be positioned at various different locations on the vehicle 400. As an example, in some implementations, one or more cameras and/or LIDAR sensors can be located in a pod or other structure that is mounted on a roof of the vehicle 400 while one or more RADAR sensors can be located in or behind the front and/or rear bumper(s) or body panel(s) of the vehicle 400. As another example, camera(s) can be located at the front or rear bumper(s) of the vehicle 400. Other locations can be used as well.

The localizer system 430 receives some or all of the sensor data from sensors 401 and generates vehicle poses for the vehicle 400. A vehicle pose describes a position and attitude of the vehicle 400. The vehicle pose (or portions thereof) can be used by various other components of the vehicle autonomy system 402 including, for example, the perception system 403, the prediction system 404, the motion planning system 405, and the navigator system 413.

The position of the vehicle 400 is a point in a three-dimensional space. In some examples, the position is described by values for a set of Cartesian coordinates, although any other suitable coordinate system may be used. The attitude of the vehicle 400 generally describes the way in which the vehicle 400 is oriented at its position. In some examples, attitude is described by a yaw about the vertical axis, a pitch about a first horizontal axis, and a roll about a second horizontal axis. In some examples, the localizer system 430 generates vehicle poses periodically (e.g., every second, every half second). The localizer system 430 appends time stamps to vehicle poses, where the time stamp for a pose indicates the point in time that is described by the pose. The localizer system 430 generates vehicle poses by comparing sensor data (e.g., remote sensor data) to map data 426 describing the surrounding environment of the vehicle 400.

In some examples, the localizer system 430 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 430 generates vehicle poses. Accordingly, the pose filter generates some vehicle poses by extrapolating from a previous pose estimate utilizing motion sensor data.

Vehicle poses and/or vehicle positions generated by the localizer system 430 are provided to various other components of the vehicle autonomy system 402. For example, the commander system 411 may utilize a vehicle position to determine whether to respond to a call from a dispatch system 440.

The commander system 411 determines a set of one or more target locations that are used for routing the vehicle 400. The target locations are determined based on user input received via a user interface 409 of the vehicle 400. The user interface 409 may include and/or use any suitable input/output device or devices. In some examples, the commander system 411 determines the one or more target locations considering data received from the dispatch system 440. The dispatch system 440 is programmed to provide instructions to multiple vehicles, for example, as part of a fleet of vehicles for moving passengers and/or cargo. Data from the dispatch system 440 can be provided via a wireless network, for example.

The navigator system 413 receives one or more target locations from the commander system 411 and map data 426. Map data 426, for example, provides detailed information about the surrounding environment of the vehicle 400. Map data 426 provides information regarding identity and location of different roadways and segments of roadways (e.g., lane segments or route components). A roadway is a place where the vehicle 400 can drive and may include, for example, a road, a street, a highway, a lane, a parking lot, or a driveway. Routing graph data is a type of map data 426.

From the one or more target locations and the map data 426, the navigator system 413 generates route data describing a route for the vehicle to take to arrive at the one or more target locations. In some implementations, the navigator system 413 determines route data using one or more path planning algorithms based on costs for route components, as described herein. For example, a cost for a route can indicate a time of travel, risk of danger, or other factor associated with adhering to a particular candidate route. Route data describing a route is provided to the motion planning system 405, which commands the vehicle controls 407 to implement the route or route extension, as described herein. The navigator system 413 can generate routes as described herein using a general purpose routing graph and constraint data. Also, in examples where route data is received from a dispatch system, that route data can also be provided to the motion planning system 405.

The perception system 403 detects objects in the surrounding environment of the vehicle 400 based on sensor data, map data 426, and/or vehicle poses provided by the localizer system 430. For example, map data 426 used by the perception system describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 402 in comprehending and perceiving its surrounding environment and its relationship thereto.

In some examples, the perception system 403 determines state data for one or more of the objects in the surrounding environment of the vehicle 400. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 400; minimum path to interaction with the vehicle 400; minimum time duration to interaction with the vehicle 400; and/or other state information.

In some implementations, the perception system 403 determines state data for each object over a number of iterations. In particular, the perception system 403 updates the state data for each object at each iteration. Thus, the perception system 403 detects and tracks objects, such as other vehicles, that are proximate to the vehicle 400 over time.

The prediction system 404 is configured to predict one or more future positions for an object or objects in the environment surrounding the vehicle 400 (e.g., an object or objects detected by the perception system 403). The prediction system 404 generates prediction data associated with one or more of the objects detected by the perception system 403. In some examples, the prediction system 404 generates prediction data describing each of the respective objects detected by the prediction system 404.

Prediction data for an object is indicative of one or more predicted future locations of the object. For example, the prediction system 404 may predict where the object will be located within the next 5 seconds, 20 seconds, 200 seconds, and so forth. Prediction data for an object may indicate a predicted trajectory (e.g., predicted path) for the object within the surrounding environment of the vehicle 400. For example, the predicted trajectory (e.g., path) can indicate a path along which the respective object is predicted to travel over time (and/or the speed at which the object is predicted to travel along the predicted path). The prediction system 404 generates prediction data for an object, for example, based on state data generated by the perception system 403. In some examples, the prediction system 404 also considers one or more vehicle poses generated by the localizer system 430 and/or map data 426.

In some examples, the prediction system 404 uses state data indicative of an object type or classification to predict a trajectory for the object. As an example, the prediction system 404 can use state data provided by the perception system 403 to determine that a particular object (e.g., an object classified as a vehicle) approaching an intersection and maneuvering into a left-turn lane intends to turn left. In such a situation, the prediction system 404 predicts a trajectory (e.g., path) corresponding to a left-turn for the vehicle 400 such that the vehicle 400 turns left at the intersection. Similarly, the prediction system 404 determines predicted trajectories for other objects, such as bicycles, pedestrians, parked vehicles, and so forth. The prediction system 404 provides the predicted trajectories associated with the object(s) to the motion planning system 405.

In some implementations, the prediction system 404 is a goal-oriented prediction system 404 that generates one or more potential goals, selects one or more of the most likely potential goals, and develops one or more trajectories by which the object can achieve the one or more selected goals. For example, the prediction system 404 can include a scenario generation system that generates and/or scores the one or more goals for an object and a scenario development system that determines the one or more trajectories by which the object can achieve the goals. In some implementations, the prediction system 404 can include a machine-learned goal-scoring model, a machine-learned trajectory development model, and/or other machine-learned models.

The motion planning system 405 commands the vehicle controls based at least in part on the predicted trajectories associated with the objects within the surrounding environment of the vehicle 400, the state data for the objects provided by the perception system 403, vehicle poses provided by the localizer system 430, map data 426, and route or route extension data provided by the navigator system 413. Stated differently, given information about the current locations of objects and/or predicted trajectories of objects within the surrounding environment of the vehicle 400, the motion planning system 405 determines control commands for the vehicle 400 that best navigate the vehicle 400 along the route or route extension relative to the objects at such locations and their predicted trajectories on acceptable roadways.

In some implementations, the motion planning system 405 can also evaluate one or more cost functions and/or one or more reward functions for each of one or more candidate control commands or sets of control commands for the vehicle 400. Thus, given information about the current locations and/or predicted future locations/trajectories of objects, the motion planning system 405 can determine a total cost (e.g., a sum of the cost(s) and/or reward(s) provided by the cost function(s) and/or reward function(s)) of adhering to a particular candidate control command or set of control commands. The motion planning system 405 can select or determine a control command or set of control commands for the vehicle 400 based at least in part on the cost function(s) and the reward function(s). For example, the motion plan that minimizes the total cost can be selected or otherwise determined.

In some implementations, the motion planning system 405 can be configured to iteratively update the route or route extension for the vehicle 400 as new sensor data is obtained from one or more sensors 401. For example, as new sensor data is obtained from one or more sensors 401, the sensor data can be analyzed by the perception system 403, the prediction system 404, and the motion planning system 405 to determine the motion plan.

The motion planning system 405 can provide control commands to one or more vehicle controls 407. For example, the one or more vehicle controls 407 can include throttle systems, brake systems, steering systems, and other control systems, each of which can include various vehicle controls (e.g., actuators or other devices that control gas flow, steering, braking) to control the motion of the vehicle 400. The various vehicle controls 407 can include one or more controllers, control devices, motors, and/or processors.

The vehicle controls 407 include a brake control module 420. The brake control module 420 is configured to receive a braking command and bring about a response by applying (or not applying) the vehicle brakes. In some examples, the brake control module 420 includes a primary system and a secondary system. The primary system receives braking commands and, in response, brakes the vehicle 400. The secondary system may be configured to determine a failure of the primary system to brake the vehicle 400 in response to receiving the braking command.

A steering control system 432 is configured to receive a steering command and bring about a response in the steering mechanism of the vehicle 400. The steering command is provided to a steering system to provide a steering input to steer the vehicle 400.

A lighting/auxiliary control module 436 receives a lighting or auxiliary command. In response, the lighting/auxiliary control module 436 controls a lighting and/or auxiliary system of the vehicle 400. Controlling a lighting system may include, for example, turning on, turning off, or otherwise modulating headlines, parking lights, running lights, and so forth. Controlling an auxiliary system may include, for example, modulating windshield wipers, a defroster, and so forth.

A throttle control system 434 is configured to receive a throttle command and bring about a response in the engine speed or other throttle mechanism of the vehicle. For example, the throttle control system 434 can instruct an engine and/or engine controller, or other propulsion system component, to control the engine or other propulsion system of the vehicle 400 to accelerate, decelerate, or remain at its current speed.

Each of the perception system 403, the prediction system 404, the motion planning system 405, the commander system 411, the navigator system 413, and the localizer system 430 can be included in or otherwise be a part of a vehicle autonomy system 402 configured to control the vehicle 400 based at least in part on data obtained from one or more sensors 401. For example, data obtained by one or more sensors 401 can be analyzed by each of the perception system 403, the prediction system 404, and the motion planning system 405 in a consecutive fashion in order to control the vehicle 400. While FIG. 4 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 402 includes one or more computing devices, which may implement all or parts of the perception system 403, the prediction system 404, the motion planning system 405 and/or the localizer system 430. Descriptions of hardware and software configurations for computing devices to implement the vehicle autonomy system 402 and/or the remote routing system 104 are provided herein at FIGS. 12 and 13.

Figure 5:
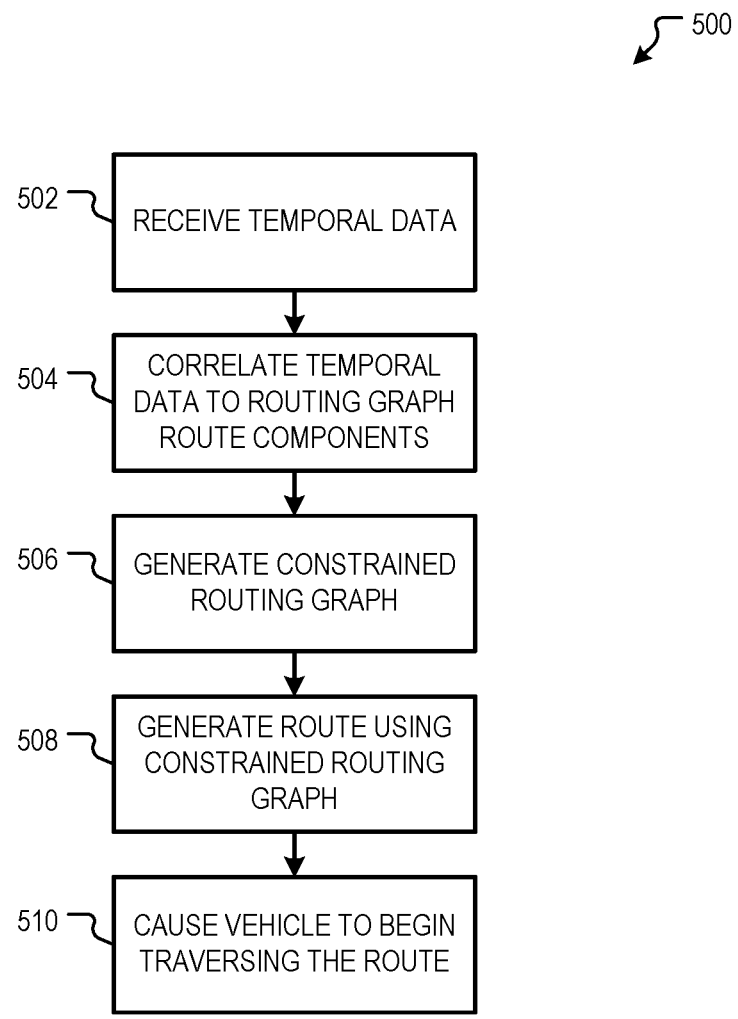
FIG. 5 is a flowchart showing one example of a process flow that can be executed by a routing system to route an autonomous vehicle using temporal data.

FIG. 5 is a flowchart showing one example of a process flow 500 that can be executed by a routing system, such as the remote routing systems 104 or 304 of FIGS. 1 and 3, the navigator 202 of FIG. 2, and/or the routing engine 305 of FIG. 3 to route an autonomous vehicle using temporal data.

At operation 502, the routing system receives temporal data. As described herein, temporal data describes a roadway condition and a location of the condition. Temporal data may also describe or imply a time when the roadway condition exists. Temporal data may be received from various different temporal data sources, such as 116A, 116B, 116N described herein.

At operation 504, the routing system correlates temporal data to routing graph components. This can be performed, for example, as described in more detail herein at FIGS. 6-10. Correlating temporal data to routing graph components can yield routing constraints. At operation 506, the routing system generates a constrained routing graph. For example, generating the constrained routing graph can include applying one or more routing constraints to a general purpose routing graph, such as the example routing graph 120. For example, generating the constrained routing graph can include modifying cost and/or connectivity of the input routing graph.

At operation 508, the routing system generates a route using the constrained routing graph. The routing system may generate the route, for example, using a path planning algorithm such as A*, D*, Focused D*, D* Lite, GD*, Dijkstra's algorithm, and so forth. At operation 510, the routing system can cause a vehicle to begin traversing the route. In examples in which the routing system is onboard an autonomous vehicle, this can include providing the route to a motion planner. The motion planner can, in turn, generate control signals for the vehicle controls. In examples in which the routing system is not onboard the autonomous vehicle, this can include providing the route to the autonomous vehicle, for example, as a route offer. The autonomous vehicle may accept or decline the offer. When the autonomous vehicle accepts the offer, a vehicle autonomy system at the autonomous vehicle may begin to control the vehicle in accordance with the route.

Figure 6:
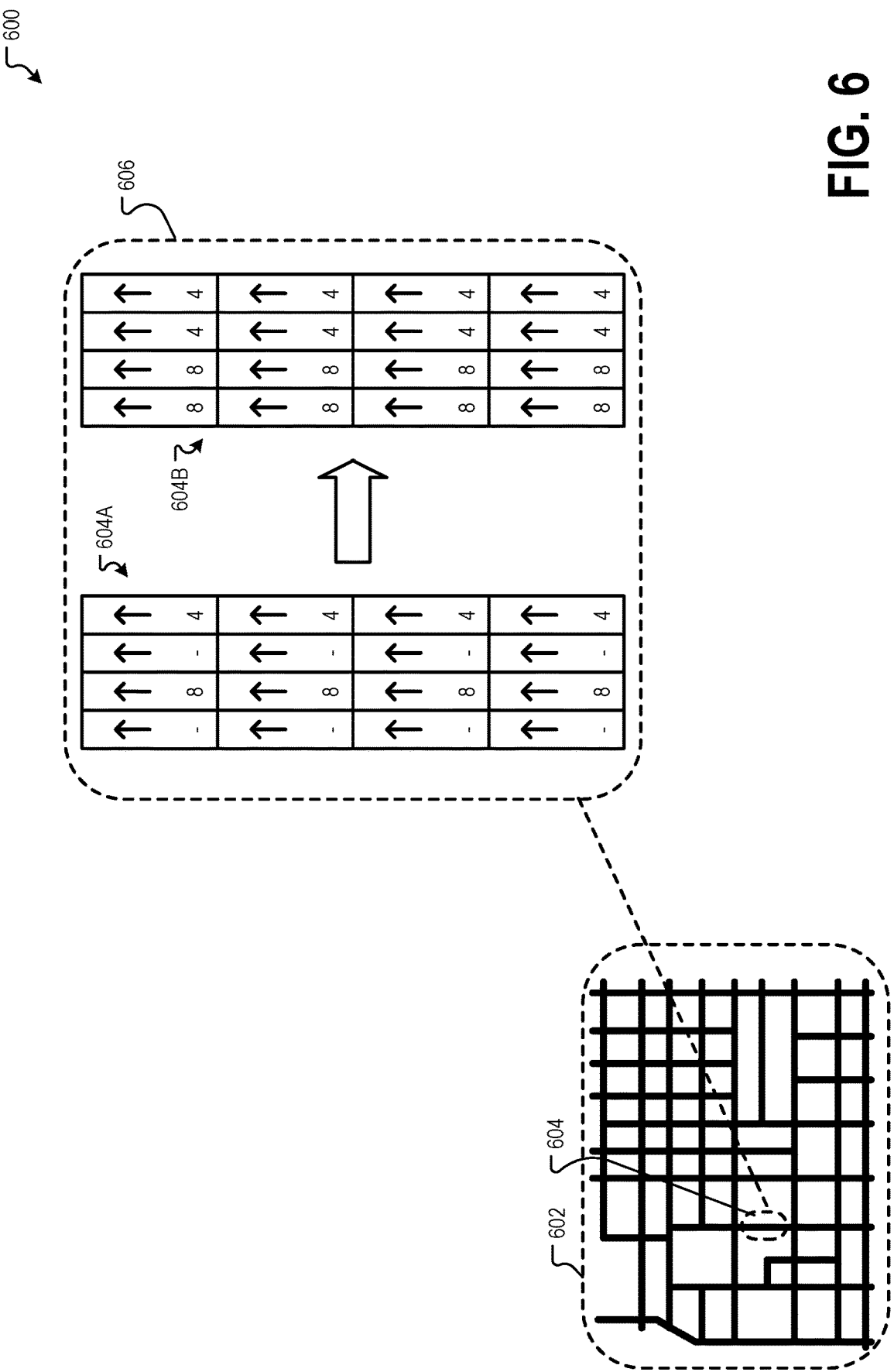
FIG. 6 is a diagram illustrating one example of correlating sparse temporal data to route components of a routing graph.

FIG. 6 is a diagram 600 illustrating one example of correlating sparse temporal data to route components of a routing graph. An example routing graph 602 is shown. An example portion 604 of the routing graph is shown in a window 606. In the left side of the window 606, a first version 604A of the portion 604 is shown populated with temporal data indicating a speed of travel in the respective route components. Route components having associated temporal data include a number indicating the speed of travel for that route component. Route components for which no temporal data is available are shown with a dash instead of a number.

In some examples, the first version 604A of the portion 604 is generated from GPS traces gathered from one or more vehicles that previously traversed the roadway corresponding to the portion 604. In this example, a first vehicle traversed route components labeled with "4" at a speed of 4 meters/second (m/s). A second vehicle traversed the route components labeled "8" at a speed of 8 m/s. In some examples, the labeled numbers indicate a combination of data from different vehicles, such as an average speed of vehicles traversing the route component, a median speed, and so forth. Route components marked with "–" do not have available temporal data in this example. For example, GPS trace data from vehicles traversing those route components may not be available. Also, in some examples, GPS trace data from the roadway corresponding to the portion 604 may not be accurate enough to discriminate between adjacent lanes of travel.

In some examples, correlating temporal data with route components includes propagating temporal data from route components having associated temporal data to route components that lack associated temporal data. In the example of FIG. 6, route components lacking temporal data in the first version 604A are correlated to adjacent route components having associated temporal data to generate the second version 604B.

Correlations can be parallel to or perpendicular to the direction of travel in a lane. For example, temporal data for a route component can be correlated to an adjacent route component that is perpendicular to the direction of travel in the route components. For example, speed data for one route component can be correlated to the route component corresponding to an adjacent lane. In some examples, temperature data from a route component can also be correlated to other route components along the direction of travel. In some examples, correlations are based on a threshold that depends on direction. For example, temporal data may be correlated to adjacent route components perpendicular to the direction of travel and/or correlated to route components with a threshold distance parallel to the direction of travel.

Figure 7:
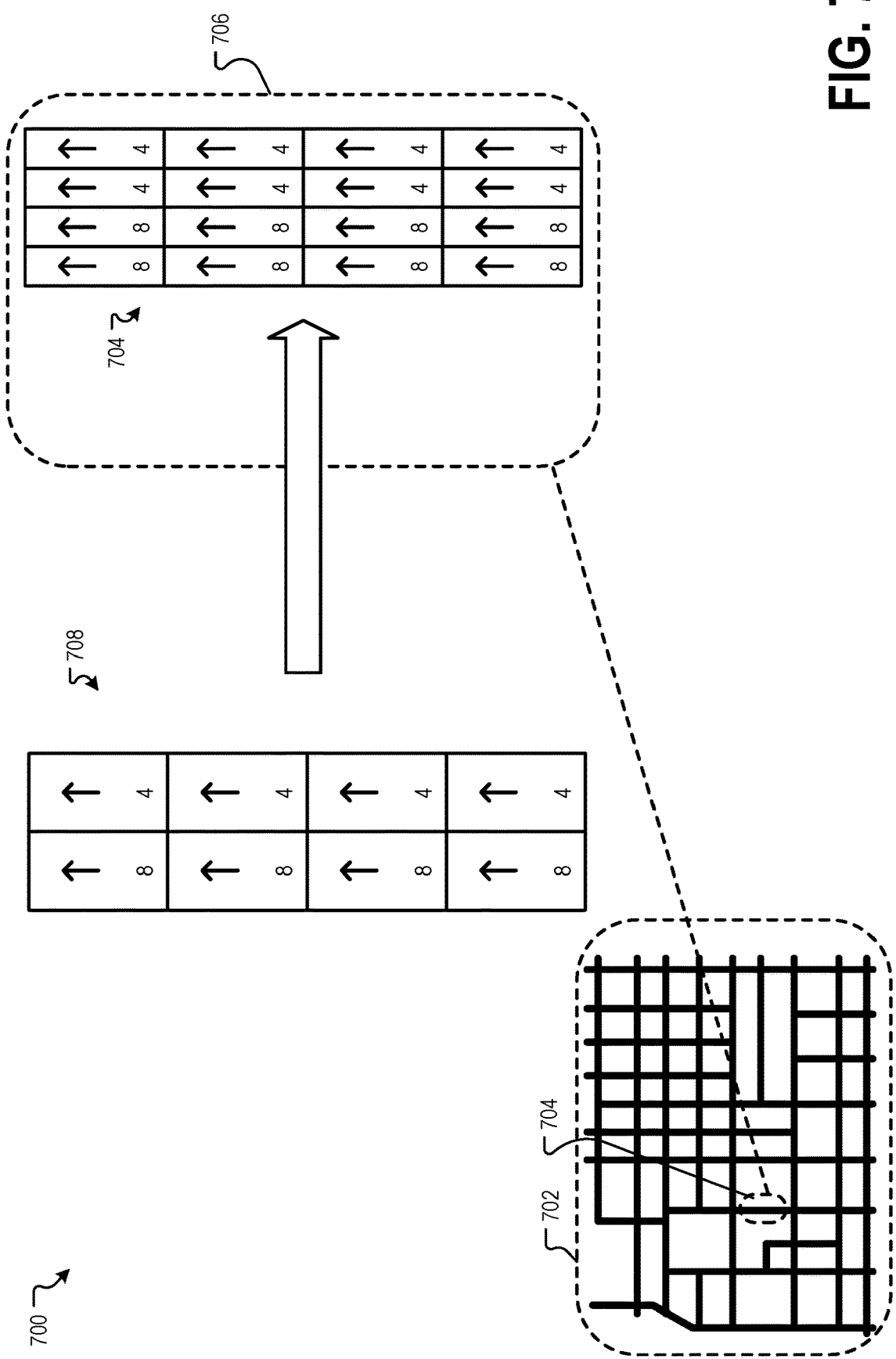
FIG. 7 is a diagram illustrating another example of correlating sparse temporal data to route components of a routing graph.

FIG. 7 is a diagram 700 illustrating another example of correlating sparse temporal data to route components of a routing graph. Here, an example routing graph 702 is shown. A representation shows temporal data 708. In the example of FIG. 7, the temporal data 708 is received in a format of an alternative routing graph or map that does not have a one-to-one correlation to the routing graph 702. In this example, one unit of the temporal data 708 corresponds to more than one route component of a portion 704 of the routing graph. The temporal data 708 can be correlated to route components, as shown at 706, by setting the value of more than one route component to the temporal data 708 value indicated by a single unit of the alternate routing graph or map.

Figure 8:
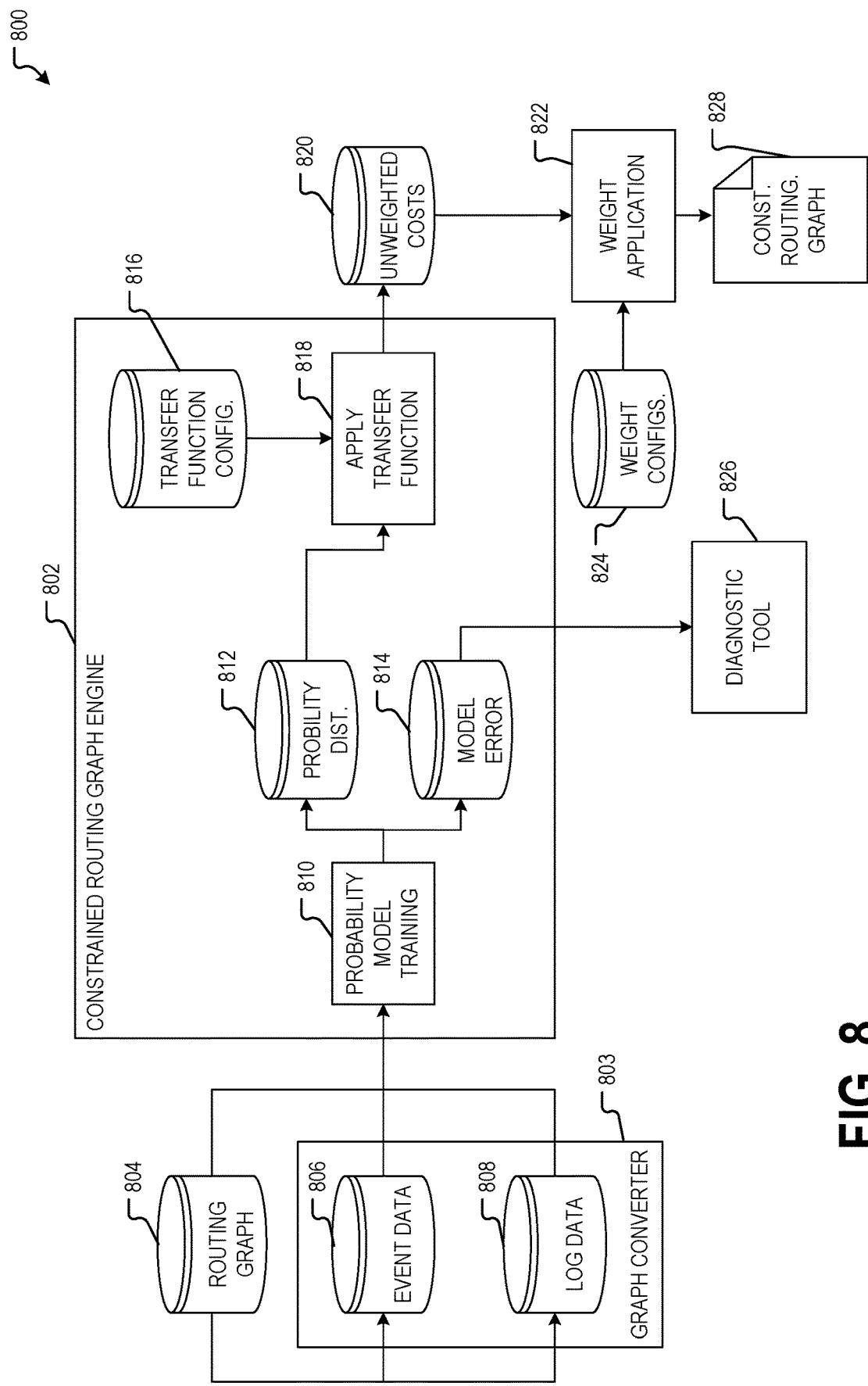
FIG. 8 is a workflow showing an example implementation of a graph converter and a constrained routing graph engine.

FIG. 8 is a workflow 800 showing an example implementation of a graph converter 803 and a constrained routing graph engine 802. The example of FIG. 8 can be implemented at a route routing system 104, as shown in FIG. 1, at an on-board navigator system 202 as show in FIG. 2, and/or distributed between on-board and remote components as shown in FIG. 3. In the example of FIG. 8, the graph converter 803 accesses routing graph data 804 describing a routing graph, event data 806, and log data 808.

Event data 806 indicates events that occurred related to vehicles, such as autonomous vehicles, while the autonomous vehicles were on trips. Various different types of events can occur on a trip and be described by event data 806. One example event that can occur on a trip is an intervention. An intervention occurs when the vehicle autonomy system of an autonomous vehicle ceases to control the vehicle. This can occur, for example, if the vehicle autonomy system crashes, if the autonomous vehicle encounters a road condition through which it cannot direct the vehicle, if the autonomous vehicle encounters a route component, and so forth. In some examples, the autonomous vehicle carries a human user who can assume control upon the occurrence of an intervention. Also, in some examples, the autonomous vehicle is configured to pull to a safe stopping location upon the occurrence of an intervention.

Another example event that can occur on a trip is receiving a passenger rating below a passenger rating threshold. In some examples, users can provide a passenger rating for a trip (e.g., after the trip is executed). A passenger rating indicates a user's level of satisfaction with a trip.

Yet another example of an event that can occur on a trip is a deviation from a planned route. For example, when a remote routing system and/or associated dispatch system requests that an autonomous vehicle execute a route, it may provide the route for the selected autonomous vehicle generated by the remote routing system. The autonomous vehicle, for various reasons, may deviate from this route. For example, the autonomous vehicle can include and/or be in communication with another routing engine and/or other component that can route the vehicle. The autonomous vehicle can disregard the received route and/or deviate from the received route.

Another example event that can occur with a trip is when an autonomous vehicle declines a trip. An autonomous vehicle can decline a trip for various reasons including, for example, if the autonomous vehicle determines that the trip will cause the autonomous vehicle to traverse a route component that is impassable or otherwise unfavorable to the autonomous vehicle.

A further example of an event that can occur on a trip is a deviation from an estimated time of arrival. For example, the routes generated by a routing engine can include an estimated time of arrival for the various autonomous vehicles, where the estimated time of arrival indicates when the autonomous vehicle is estimated to complete the trip.

Log data 808 describes trips taken by one or more vehicles, which may be autonomous vehicles or non-autonomous vehicles. For example, log data 808 can include GPS traces of vehicles while on trips, where the location associated with a data item is indicated by the GPS reading associated with the GPS trace. In some examples, log data 808 includes a reference to a routing graph or map, which may or may not be the routing graph 804. The graph converter 803 correlates the event data 806 and the log data 808 to the routing graph 804, for example, as described herein.

The constrained routing graph engine 802 receives the correlated data and generates a probability model for different events and conditions at probability model training 810. The probability model training 810 can include, for events, expressing a probability of one or more different events occurring at different route components. For log data 808, probability model training can include describing a probability of roadway conditions indicated by log data 808 such as, for example, traffic conditions, weather conditions, and so forth. The probabilities of events and conditions determined at probability model training 810 can be determined as a function of a particular route component and/or route component properties. Results of the probability model training 810 include probability distribution data 812 describing the determined probabilities for different events and conditions as well as model error data 814 describing errors of the models. The model error data can be viewed, for example, by an administrative user, at a diagnostic tool 826.

At a transfer function operation 818, the constrained routing graph engine 802 applies transfer function configuration data 816 to convert the probability distribution data 812 to unweighted costs for route components of the routing graph 804. For example, the probability of an event or condition can be converted, for example, to a cost expressed as a time. The time can be generated in any suitable manner including, for example, an estimated time lost to an event or condition multiplied by the probability that the event or condition will occur at a given route component, as indicated by the probability distribution 812.

The results of applying the transfer function at operation 818 may be unweighted costs 820 for the routing graph. At operation 822, the constrained routing graph engine 802 can weigh the unweighted costs using, for example, weight configuration data 824. The weight configuration data 824 indicates the importance of avoiding events of different types. For example, an event that is dangerous to a vehicle and/or its passengers or cargo may be weighted higher than just the time lost multiplied by the probability of the events occurrence. Weight configuration data 824 can be received, for example, from an administrative user. The result of applying the weights is a constrained routing graph 828.

Figure 9:
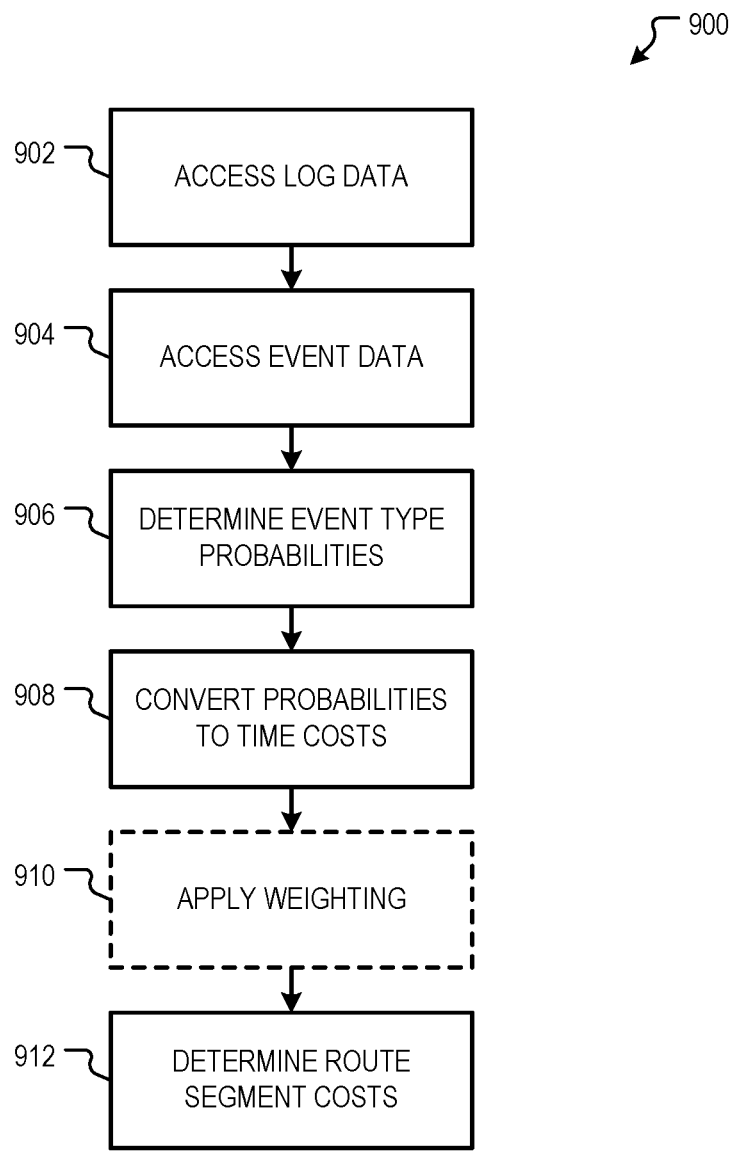
FIG. 9 is a flowchart showing one example of a process flow for executing the workflow of FIG. 8.

FIG. 9 is a flowchart showing one example of a process flow 900 for executing the workflow 800 of FIG. 8. At operation 902, the constrained routing graph engine 802 accesses log data 808. For example, the constrained routing graph engine 802 may request the log data 808 from the graph converter 803. At operation 904, the constrained routing graph engine 802 accesses event data. At operation 906, the constrained routing graph engine 802 determines event probabilities, for example, as described herein with respect to probability model training 810. Event probabilities can be expressed, for example, with respect to a routing graph component or components having a particular property. In one example, routing graph components having a speed limit of greater than 35 miles per hour have an X % probability of an intervention.

At operation 908, the constrained routing graph engine 802 converts probabilities determined at operation 906 to time costs. For example, an X % probability of an intervention at route components having a particular property or set of properties can be expressed as adding Y seconds to the cost of traversing the route components. In some examples, converting probabilities to time costs can be performed, for example, by applying transfer function configuration data 816 to the probability distribution data 812. Optionally, at operation 910, the constrained routing graph engine 802 applies weightings to the time costs to generate weighted time costs. At operation 912, the constrained routing graph engine 802 determines route segment costs for the constrained routing graph 828, for example, by applying the costs determined at operations 908 and/or 910 to a routing graph.

Figure 10:
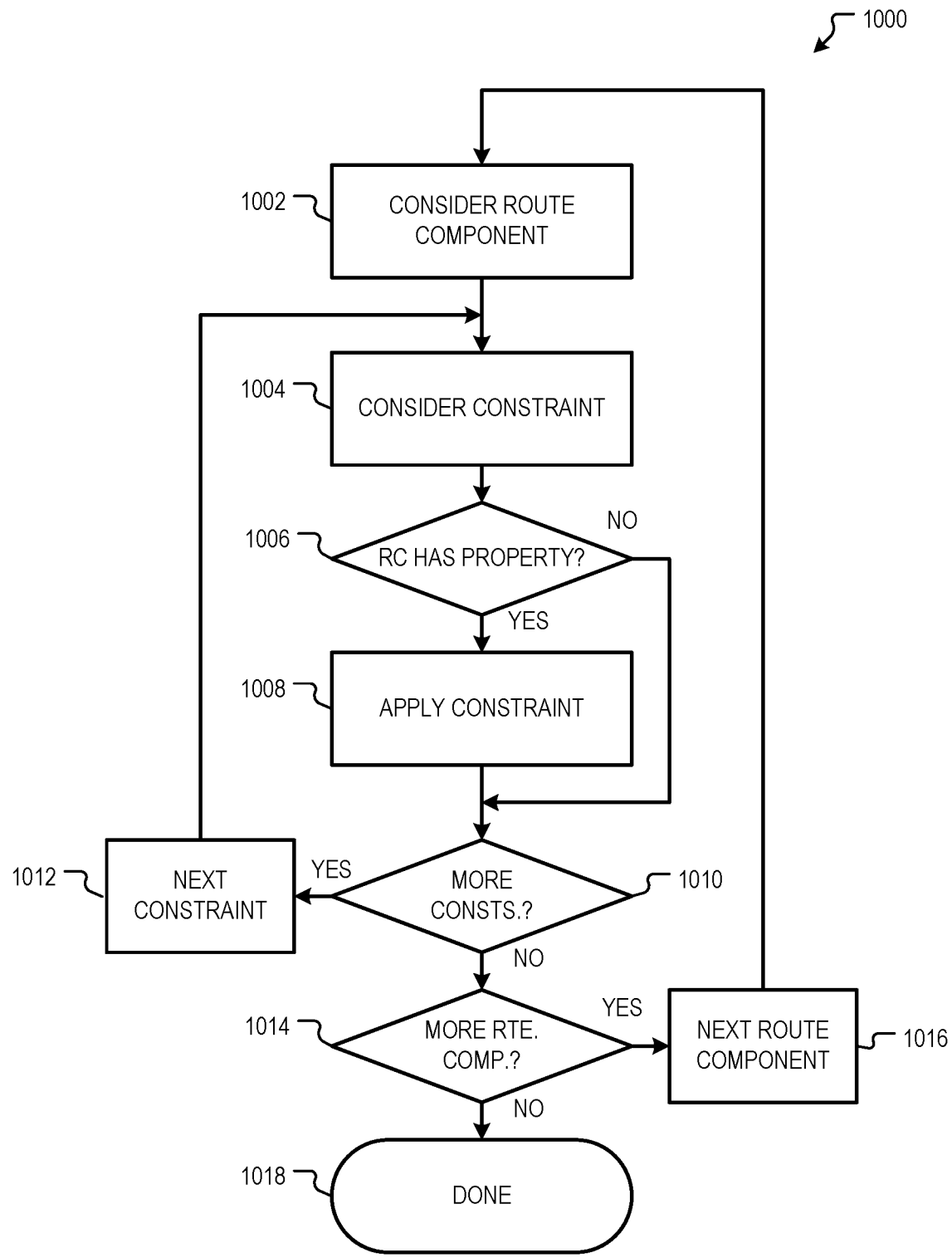
FIG. 10 is a flowchart showing one example of a process flow for generating a constrained routing graph by applying one or more routing constraints.

FIG. 10 is a flowchart showing one example of a process flow 1000 for generating a constrained routing graph by applying one or more routing constraints. At operation 1002, a routing system considers a route component from a routing graph, such as the general purpose routing graph 120 described herein. At operation 1004, the routing system considers a routing constraint. The routing constraint indicates a route component property or properties and a routing graph modification. In some examples, the routing constraint is generated according to the workflow 800 and/or process flow 900. For example, the operations 818 and/or 822 can generate a cost to be added to or subtracted from a route component having a particular property or set of properties. The cost change indicates a modification to a routing graph that, in conjunction with the property of set of properties, can make up all or part of a routing constraint.

At operation 1006, the routing system determines whether the considered route component has the property or set of properties indicated by the considered routing constraint. If yes, the routing system, at operation 1008, applies the routing graph modification indicated by the routing constraint. This can include, for example, modifying a cost associated with the route component, modifying a connectivity between the route component and other route components, and so forth. If the route component does not include the property or set of properties indicated by the routing constraint and/or upon applying the constraint, the routing system determines, at operation 1010, if there are additional routing constraints to be applied. If yes, the routing system moves to the next constraint at operation 1012 and considers the constraint beginning at operation 1004, as described herein. If there are no more constraints at operation 1010, the routing system determines, at operation 1014, if there are additional route components from the routing graph to be considered. If yes, the routing system moves to the next route segment at operation 1016 and considers the next route component beginning at operation 1002, as described herein. If no route components remain to be considered, the process flow 1000 may be completed at operation 1018.

Figure 11:
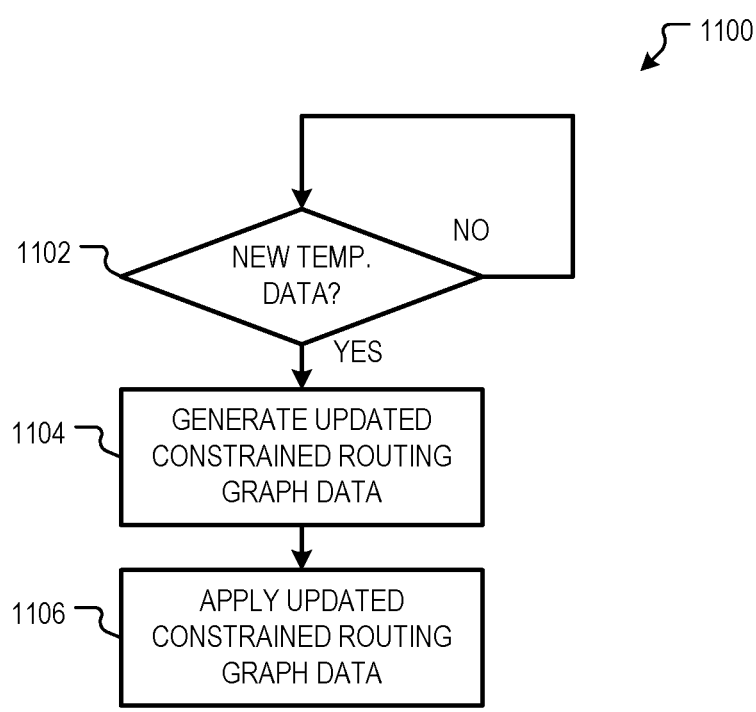
FIG. 11 is a flowchart showing one example of a process flow for generating an updated constrained routing graph based on new temporal data.

FIG. 11 is a flowchart showing one example of a process flow 1100 for generating an updated constrained routing graph based on new temporal data. At operation 1102, the routing system determines if new temporal data has been received. New temporal data can be received from temporal data sources, such as sources 116A, 116B, 116N, for example, as the conditions of roadways change. For example, a temporal data source 116A, 116B, 116N providing traffic data may provide updated traffic data upon the detection of increased traffic congestion at a roadway or roadways. If no new temporal data is received, the process may return to operation 1102, for example, periodically, to again determine whether new temporal data is received.

If updated temporal data is received at operation 1102, the routing system may generate updated constrained routing graph data at operation 1104. This can include, for example, generating new or updated routing constraints based on the new temporal data and applying the new or updated routing constraints to the general purpose routing graph and/or to the previously-generated constrained routing graph. At operation 1106, the routing system applies the updated constrained routing graph data, for example, to generate routes for one or more vehicles as described herein.

Figure 12:
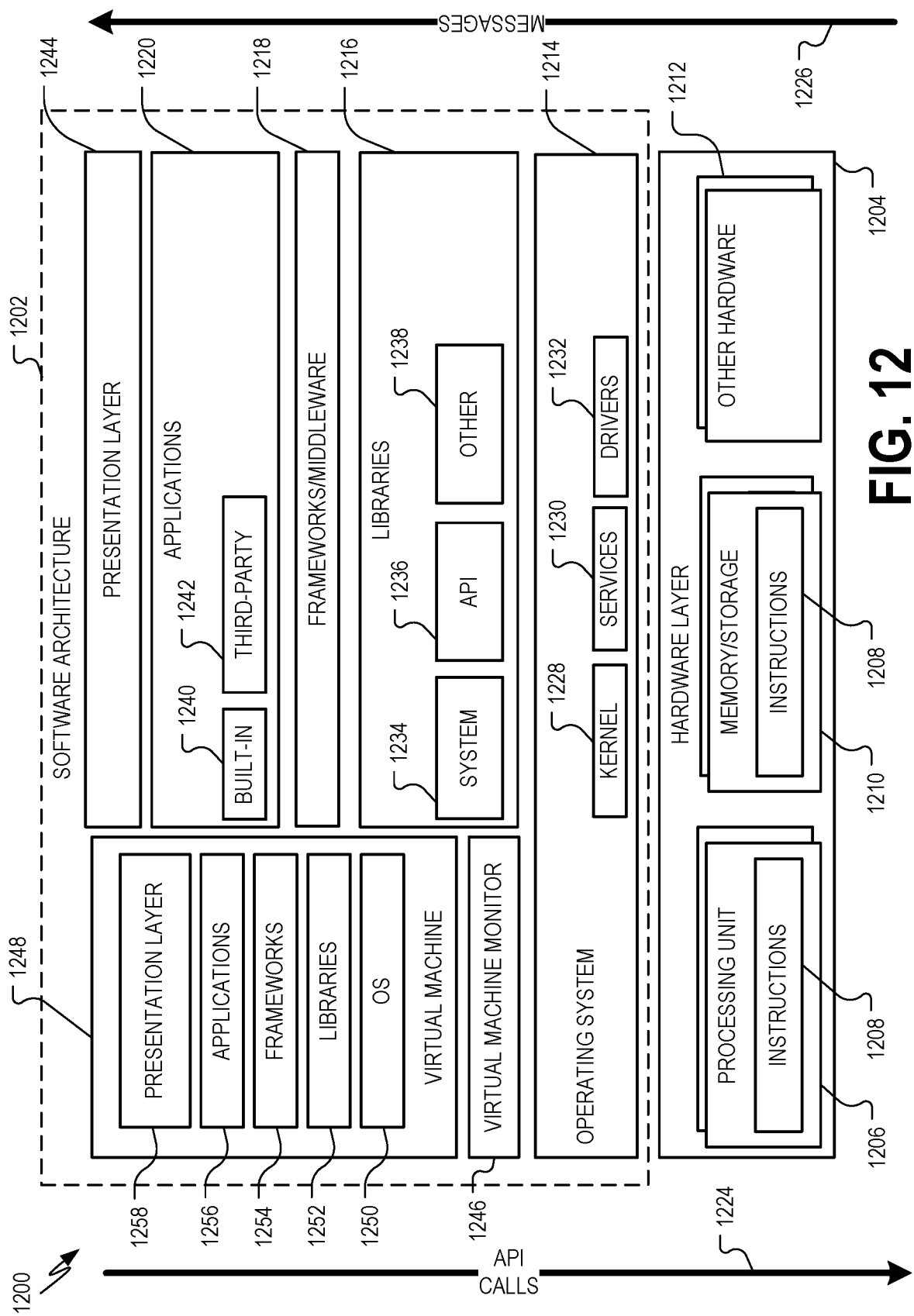
FIG. 12 is a block diagram showing one example of a software architecture for a computing device.

FIG. 12 is a block diagram 1200 showing one example of a software architecture 1202 for a computing device. The software architecture 1202 may be used in conjunction with various hardware architectures, for example, as described herein. FIG. 12 is merely a non-limiting example of a software architecture 1202 and many other architectures may be implemented to facilitate the functionality described herein. A representative hardware layer 1204 is illustrated and can represent, for example, any of the above-referenced computing devices. In some examples, the hardware layer 1204 may be implemented according to an architecture 1300 of FIG. 13 and/or the software architecture 1202 of FIG. 12.

The representative hardware layer 1204 comprises one or more processing units 1206 having associated executable instructions 1208. The executable instructions 1208 represent the executable instructions of the software architecture 1202, including implementation of the methods, modules, components, and so forth of FIGS. 1-11. The hardware layer 1204 also includes memory and/or storage modules 1210, which also have the executable instructions 1208. The hardware layer 1204 may also comprise other hardware 1212, which represents any other hardware of the hardware layer 1204, such as the other hardware illustrated as part of the architecture 700.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke API calls 1224 through the software stack and receive a response, returned values, and so forth illustrated as messages 1226 in response to the API calls 1224. The layers illustrated are representative in nature and not all software architectures have all layers. For example, some mobile or special-purpose operating systems may not provide a frameworks/middleware 1218 layer, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of a hardware or software interrupt and, in response, cause the software architecture 1202 to pause its current processing and execute an interrupt service routine (ISR) when an interrupt is received. The ISR may generate an alert.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be used by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be used by the applications 1220 and/or other software components/modules. For example, the frameworks 1218 may provide various graphical user interface (GUI) functions, high-level resource management, high-level location services, and so forth. The frameworks 1218 may provide a broad spectrum of other APIs that may be used by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. The third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1242 may invoke the API calls 1224 provided by the mobile operating system such as the operating system 1214 to facilitate functionality described herein.

The applications 1220 may use built-in operating system functions (e.g., kernel 1228, services 1230, and/or drivers 1232), libraries (e.g., system libraries 1234, API libraries 1236, and other libraries 1238), or frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 12, this is illustrated by a virtual machine 1248. A virtual machine creates a software environment where applications/modules can execute as if they were executing on a hardware computing device. The virtual machine 1248 is hosted by a host operating system (e.g., the operating system 1214) and typically, although not always, has a virtual machine monitor 1246, which manages the operation of the virtual machine 1248 as well as the interface with the host operating system (e.g., the operating system 1214). A software architecture executes within the virtual machine 1248, such as an operating system 1250, libraries 1252, frameworks/middleware 1254, applications 1256, and/or a presentation layer 1258. These layers of software architecture executing within the virtual machine 1248 can be the same as corresponding layers previously described or may be different.

Figure 13:
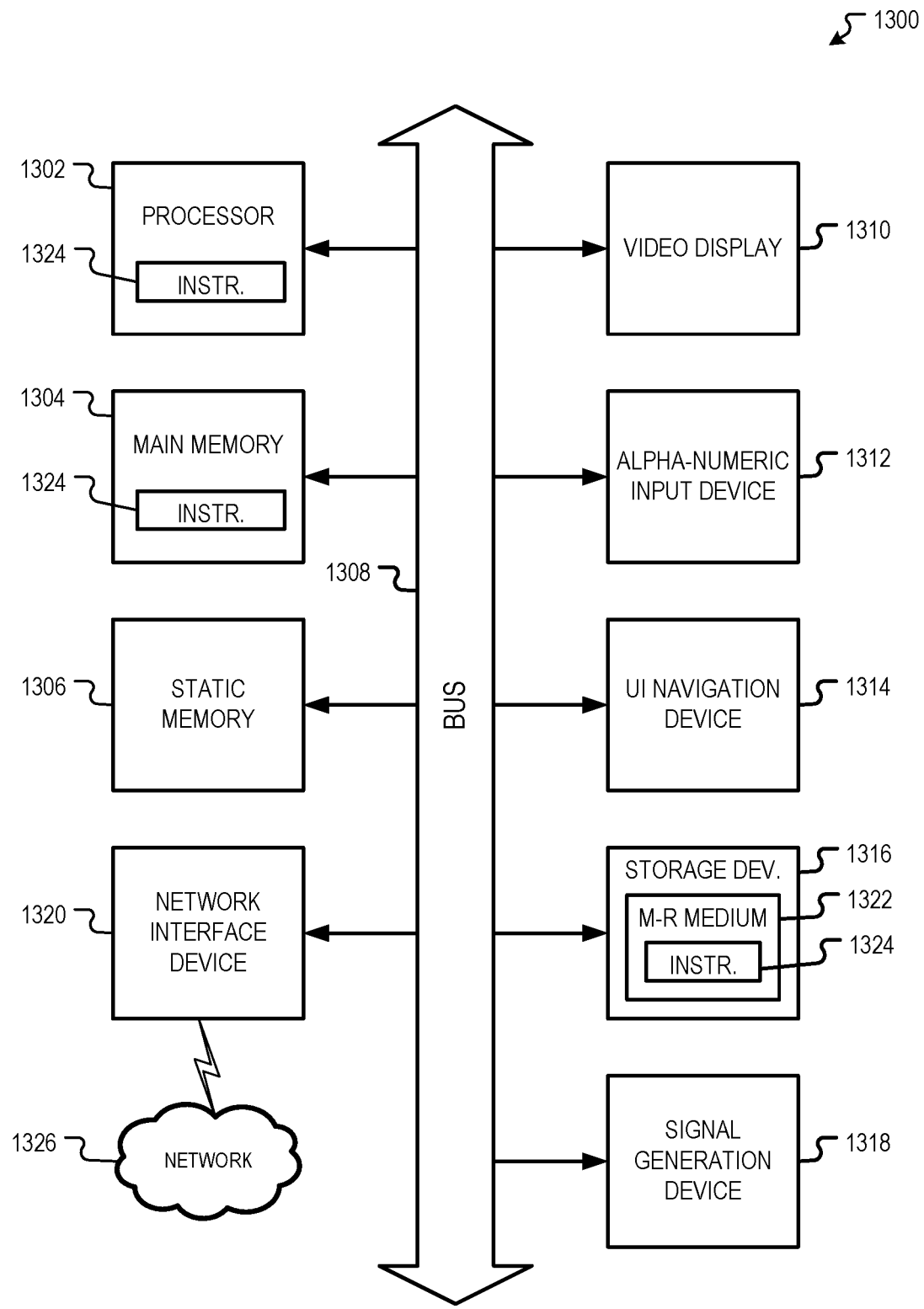
FIG. 13 is a block diagram illustrating a computing device hardware architecture.

FIG. 13 is a block diagram illustrating a computing device hardware architecture 1300, within which a set or sequence of instructions can be executed to cause a machine to perform examples of any one of the methodologies discussed herein. The hardware architecture 1300 describes a computing device for executing the vehicle autonomy system, described herein.

The architecture 1300 may operate as a standalone device or may be connected (e.g., networked) to other machines. In a networked deployment, the architecture 1300 may operate in the capacity of either a server or a client machine in server-client network environments, or it may act as a peer machine in peer-to-peer (or distributed) network environments. The architecture 1300 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1300 includes a processor unit 1302 comprising at least one processor (e.g., a central processing unit (CPU), a graphics processing unit (GPU), or both, processor cores, compute nodes). The architecture 1300 may further comprise a main memory 1304 and a static memory 1306, which communicate with each other via a link 1308 (e.g., bus). The architecture 1300 can further include a video display unit 1310, an input device 1312 (e.g., a keyboard), and a UI navigation device 1314 (e.g., a mouse). In some examples, the video display unit 1310, input device 1312, and UI navigation device 1314 are incorporated into a touchscreen display. The architecture 1300 may additionally include a storage device 1316 (e.g., a drive unit), a signal generation device 1318 (e.g., a speaker), a network interface device 1320, and one or more sensors (not shown), such as a GPS sensor, compass, accelerometer, or other sensor.

In some examples, the processor unit 1302 or another suitable hardware component may support a hardware interrupt. In response to a hardware interrupt, the processor unit 1302 may pause its processing and execute an ISR, for example, as described herein.

The storage device 1316 includes a machine-readable medium 1322 on which is stored one or more sets of data structures and instructions 1324 (e.g., software) embodying or used by any one or more of the methodologies or functions described herein. The instructions 1324 can also reside, completely or at least partially, within the main memory 1304, within the static memory 1306, and/or within the processor unit 1302 during execution thereof by the architecture 1300, with the main memory 1304, the static memory 1306, and the processor unit 1302 also constituting machine-readable media.

Executable Instructions and Machine-Storage Medium

The various memories (i.e., 1304, 1306, and/or memory of the processor unit(s) 1302) and/or storage device 1316 may store one or more sets of instructions and data structures (e.g., instructions) 1324 embodying or used by any one or more of the methodologies or functions described herein.

These instructions, when executed by processor unit(s) 1302 cause various operations to implement the disclosed examples.

As used herein, the terms "machine-storage medium," "device-storage medium," "computer-storage medium" (referred to collectively as "machine-storage medium 1322") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1322 include non-volatile memory, including by way of example semiconductor memory devices, e.g., erasable programmable read-only memory (EPROM), electrically erasable programmable read-only memory (EEPROM), field programmable gate array (FPGA), and flash memory devices; magnetic disks such as internal hard disks and removable disks; magneto-optical disks; and CD-ROM and DVD-ROM disks. The terms machine-storage media, computer-storage media, and device-storage media 1322 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1324 can further be transmitted or received over a communications network 1326 using a transmission medium via the network interface device 1320 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A method for routing an autonomous vehicle, the method comprising:

accessing, by a computing device, temporal data comprising a first temporal data item, the first temporal data item describing a first roadway condition, a first time, and a first location;

accessing, by the computing device, a routing graph, the routing graph comprising a plurality of route components representing a set of roadways in a geographic area, and connectivity data describing at least one connection between a first route component of the plurality of route components and a second route component of the plurality of route components;

determining, by the computing device, that a third route component of the plurality of route components represents a portion of a roadway of the set of roadways at the first location;

propagating, by the computing device, the first temporal data item to the first route component based at least in part on a correlation between the first route component and the third route component;

generating, by the computing device, a constrained routing graph, the generating the constrained routing graph comprising modifying the connectivity data to remove a connection between the first route component and the second route component, the modifying of the at least one connection being based at least in part on the first roadway condition;

generating, by the computing device, a route for an autonomous vehicle using the constrained routing graph, the generating of the route comprising selecting a set of connected route components from the constrained routing graph, the set of connected route components extending between a route start point and a route end point; and causing, by the computing device, the autonomous vehicle to begin traversing the route.

2. The method of claim 1, wherein the first roadway condition describes a speed of travel of a vehicle over the first route component; and wherein generating the constrained routing graph comprises modifying a cost associated with the first route component using the speed of travel of the vehicle.

3. The method of claim 1, wherein the first roadway condition describes a weather condition at the first route component; and wherein generating the constrained routing graph comprises modifying a cost associated with the first route component based at least in part on the weather condition.

4. The method of claim 1, wherein generating the constrained routing graph comprises:

determining that the temporal data does not describe a second route component adjacent to the first route component in the routing graph; and modifying a cost associated with the second route component using the first roadway condition.

5. The method of claim 1, wherein the first location is a first component of an alternative routing graph, the method further comprising determining that the first component correlates to the first route component.

6. The method of claim 1, wherein the first location comprises a Global Positioning System (GPS) location, the method further comprising determining that the GPS location is within the first route component.

7. The method of claim 1, further comprising:

accessing, by the computing device, event data describing events from trips completed by autonomous vehicles;

using the event data, determining, by the computing device, a first event type probability that a first event type of event will occur when an autonomous vehicle traverses the first route component; and determining a cost for the first route component using the first event type probability and the first roadway condition.

8. The method of claim 7, further comprising applying a transfer function to the first event type probability to generate a first event type time cost for the first route component associated with the first event type.

9. The method of claim 8, further comprising:

receiving, by the computing device, a first event type weight; and determining, by the computing device, a cost for the first route component using the first roadway condition, the first event type probability, and the first event type weight.

10. A system for routing an autonomous vehicle, the system comprising:

a computing device comprising at least one processor and an associated data storage, the computing device programmed to perform operations comprising:

accessing temporal data comprising a first temporal data item, the first temporal data item describing a first roadway condition, a first time, and a first location;

accessing a routing graph, the routing graph comprising a plurality of route components representing a set of roadways in a geographic area, and connectivity data describing at least one connection between a first route component of the plurality of route components and a second route component of the plurality of route components;

determining that a third route component of the plurality of route components represents a portion of a roadway of the set of roadways at the first location;

propagating the first temporal data item to the first route component based at least in part on a correlation between the first route component and the third route component;

generating a constrained routing graph, the generating the constrained routing graph comprising modifying the connectivity data to modify the at least one connection between the first route component and the second route component, the modifying of the at least one connection being based at least in part on the first roadway condition;

generating a route for an autonomous vehicle using the constrained routing graph, the generating of the route comprising selecting a set of connected route components from the constrained routing graph, the set of connected route components extending between a route start point and a route end point; and causing the autonomous vehicle to begin traversing the route.

11. The system of claim 10, further comprising the autonomous vehicle, wherein the system is on board the autonomous vehicle.

12. The system of claim 10, wherein first roadway condition describes a speed of travel of a vehicle over the first route component; and wherein generating the constrained routing graph comprises modifying a cost associated with the first route component using the speed of travel of the vehicle.

13. The system of claim 10, wherein the first roadway condition describes a weather condition at the first route component; and wherein generating the constrained routing graph comprises modifying a cost associated with the first route component based at least in part on the weather condition.

14. The system of claim 10, wherein generating the constrained routing graph comprises:

determining that the temporal data does not describe a second route component adjacent to the first route component in the routing graph; and modifying a cost associated with the second route component using the first roadway condition.

15. The system of claim 10, wherein the first location is a first component of an alternative routing graph, the operations further comprising determining that the first component correlates to the first route component.

16. The system of claim 10, wherein the first location comprises a Global Positioning System (GPS) location, the operations further comprising determining that the GPS location is within the first route component.

17. The system of claim 10, the operations further comprising:

accessing event data describing events from trips completed by autonomous vehicles;

using the event data, determining a first event type probability that a first event type of event will occur when an autonomous vehicle traverses the first route component; and determining a cost for the first route component using the first event type probability and the first roadway condition.

18. The system of claim 17, the operations further comprising applying a transfer function to the first event type probability to generate a first event type time cost for the first route component associated with the first event type.

19. The system of claim 18, the operations further comprising:
  receiving a first event type weight; and
  determining a cost for the first route component using the first roadway condition, the first event type probability, and the first event type weight.

20. A non-transitory machine-readable medium comprising instructions thereon that, when executed by at least one processor, cause the at least one processor to perform operations comprising:
  accessing temporal data comprising a first temporal data item, the first temporal data item describing a first roadway condition, a first time, and a first location;
  accessing a routing graph, the routing graph comprising a plurality of route components representing a set of roadways in a geographic area, and connectivity data describing at least one connection between a first route component of the plurality of route components and a second route component of the plurality of route components;
  determining that third route component of the plurality of route components represents a portion of a roadway of the set of roadways at the first location;
  propagating the first temporal data item to the first route component based at least in part on a correlation between the first route component and the third route component;
  generating a constrained routing graph, the generating the constrained routing graph comprising modifying the connectivity data to modify the at least one connection between the first route component and the second route component, the modifying of the at least one connection being based at least in part on the first roadway condition;
  generating a route for an autonomous vehicle using the constrained routing graph, the generating of the route comprising selecting a set of connected route components from the constrained routing graph, the set of connected route components extending between a route start point and a route end point; and
  causing the autonomous vehicle to begin traversing the route.

* * * * *

UNITED STATES PATENT AND TRADEMARK OFFICE
CERTIFICATE OF CORRECTION

| | |
|---|---|
| PATENT NO. | : 11,519,742 B2 |
| APPLICATION NO. | : 16/721673 |
| DATED | : December 6, 2022 |
| INVENTOR(S) | : Voznesensky et al. |

It is certified that error appears in the above-identified patent and that said Letters Patent is hereby corrected as shown below:

In the Claims

In Column 26, Line 4, in Claim 20, after "that", insert --a--

Signed and Sealed this
Seventh Day of February, 2023

Katherine Kelly Vidal
*Director of the United States Patent and Trademark Office*